(12) United States Patent
Pagel

(10) Patent No.: US 7,222,236 B1
(45) Date of Patent: May 22, 2007

(54) EVIDENCING INDICIA OF VALUE USING SECRET KEY CRYPTOGRAPHY

(75) Inventor: Martin J. Pagel, Kirkland, WA (US)

(73) Assignee: Stamps.com

( * ) Notice: Subject to any disclaimer, the term of this patent is extended or adjusted under 35 U.S.C. 154(b) by 754 days.

(21) Appl. No.: 09/608,123

(22) Filed: Jun. 30, 2000

(51) Int. Cl.
*H04L 9/00* (2006.01)

(52) U.S. Cl. ............... 713/176; 713/156; 713/178; 380/277; 705/60; 705/62; 705/404

(58) Field of Classification Search ......... 705/60, 705/410, 408, 404; 380/51, 21, 44, 284; 713/176, 178; 235/495
See application file for complete search history.

(56) References Cited

U.S. PATENT DOCUMENTS

| | | | | |
|---|---|---|---|---|
| 5,390,251 A | * | 2/1995 | Pastor et al. | 705/62 |
| 5,812,666 A | * | 9/1998 | Baker et al. | 380/277 |
| 5,982,896 A | | 11/1999 | Cordery et al. | 380/21 |
| 6,005,945 A | * | 12/1999 | Whitehouse | 380/51 |
| 6,058,193 A | * | 5/2000 | Cordery et al. | 380/284 |
| 6,061,670 A | * | 5/2000 | Brand | 705/404 |
| 6,295,359 B1 | * | 9/2001 | Cordery et al. | 380/44 |
| 6,546,377 B1 | * | 4/2003 | Gravell et al. | 705/60 |
| 6,567,794 B1 | * | 5/2003 | Cordery et al. | 705/60 |
| 6,636,968 B1 | * | 10/2003 | Rosner et al. | 713/178 |

OTHER PUBLICATIONS

Requirements for the introduction of PC Franking Systems, V. 1.1, Sep. 20, 2000, Deutsche Post World Net.

* cited by examiner

*Primary Examiner*—Taghi J. Arani
*Assistant Examiner*—Carl Colin
(74) *Attorney, Agent, or Firm*—Strategic Patent Group

(57) ABSTRACT

A method and system for dispensing and evidencing indicia by an indicia generating device is disclosed in a system having a plurality of indicia generating devices that have been divided into n groups. Each of the indicia generating devices generates and prints indicia on a media that is to be received at a plurality of establishments, wherein the establishments are associated with different geographic designations. The method and system include receiving a plurality of verification keys, wherein each one of the received verification keys is encrypted as a function of a respective geographic designation. A plurality of key IDs are also received, where each one of the key IDs is associated with one of the verification keys and is encrypted as a function of the same geographic designation used to encrypt the corresponding verification key. In response to receiving a request to generate an indicium for a media destined for a particular one of the establishments, the indicia generating device evidences the indicium by generating one of the verification keys and the corresponding key ID assigned to indicia generating device's group based on the geographic designation associated with the particular establishment, and using the generated verification key to create a digital signature, and digitally signing the indicia by including the digital signature and the generated key ID in the indicia.

4 Claims, 6 Drawing Sheets

Generation and
Distribution of Keys

Verifying Postage Indicia

EVIDENCING INDICIA OF VALUE USING SECRET KEY CRYPTOGRAPHY

CROSS-REFERENCE TO RELATED APPLICATIONS

The present invention is related to co-pending U.S. patent application Ser. No. 09/608,735 now U.S. Pat. No. 6,934,839 entitled "Evidencing and Verifying Indicia Of Value Using Secret Key Cryptography," which is assigned to the assignee of the present application and filed on the same date as the present application.

FIELD OF THE INVENTION

The present invention relates to Internet postage solutions, and more particularly to evidencing and verifying any type of indicia indicating the value of goods or services using secret key cryptography.

BACKGROUND OF THE INVENTION

Systems for allowing consumers to print postage indicia on mail, rather than purchasing stamps from a post office, are well-known. An example of such a system is an Internet postage system solution that was developed by the assignee of the present application. As shown in FIG. 1, the system includes a United States Postal Service (USPS) certificate authority 10, an operations center 12, a postage generating device 14 coupled between a user's PC 16 and a printer 18, and multiple USPS distribution centers 20, which also act as postage verifiers upon receipt of the mail.

A combination of software running on the user's PC 16 and the postage generating device 14 enables the user to purchase postage from the operations center 12 via the Internet using a variety of payment options. Once obtained, the postage is secured and stored in the postage generating device 14. The user may then print a stamp in the form of a USPS-approved information based indicia (IBI) 22 onto envelopes, labels, or directly onto mail pieces while also printing the destination and return addresses. The IBI 22 is printed as a 2-D barcode that typically includes various information including the name of the user, the ID of the device, the amount of postage remaining, the zip code of the destination, and the date. Since digital imaging, printing, photocopying, and scanning technology make it fairly easy to counterfeit the IBI 22, cryptographic methods, such as asymmetric public key cryptography, have been employed to generate and validate the IBI 22. In the prior art system shown in FIG. 1, for example, the certificate authority 10 transfers a digital certificate, which is a digitally signed public key, and a certificate ID to the postage generating device 14 via the operations center 12. When generating the IBI 22, the postage generating device 14 uses an internally generated private key and the public key to digitally sign the indicia, thereby creating a digital signature. The digital signature and the certificate ID are then included in the IBI 22.

After printing the stamp and applying it to the mail piece, the mail piece is dropped in a local mailbox. The local post office then transfers the mail to a local or originating distribution center 20a. The originating distribution center 20a scans the IBI 22 using a barcode scanner to read the information on the stamp including the certificate ID and the digital signature. The originating distribution center 20a uses the certificate ID to request from USPS authorization center 10 the same digital certificate used to sign the indicia in order to verify whether the IBI 22 is acceptable or fraudulent. All mail pieces with acceptable IBI's 22 are then sorted by the first three digits of the zip code to determine the destination region. The sorted mail is then transferred from the origination distribution center 20a to the respective destination distribution center 20b located in the destination region. The destination distribution center 20b then finishes sorting the mail based on remaining digits of the zip code and the mail is delivered.

Many variations exist to the above scheme for evidencing and verifying postage. For example, U.S. Pat. No. 5,982,896 describes a symmetric fixed key set approach whereby instead of using a private key for each postage generating device 14, a set of keys is created where each key in the set is shared by multiple postage generating devices 14. In addition, the keys are made valid for only a limited amount of time to minimize the harm created by the theft of any of the keys and to limit the time for key attack.

Generating time-limited keys, however, requires that new keys be generated periodically and distributed to the postage generating devices 14. Because the step of distributing the keys typically occurs over the Internet or a private communications link, security for the keys becomes paramount. It is also important to ensure that only authorized devices use those keys.

The method described in U.S. Pat. No. 5,982,896 for securing the keys has several disadvantages. One disadvantage is that the set of the shared keys used by the postage generating devices 14 are downloaded to the originating distribution centers 20 or other postage verifier. The shared keys are individually identified by pointers, which are also downloaded to the postage verifier, but are not cryptographically protected. Thus, the postage verifier has in its possession the entire set of cryptographic keys used by the postage generating devices 14. This fact makes the postage verifier a single point of attack: if the verifier is broken into, a perpetrator may easily impersonate all postage generating devices 14 in the postal system.

Accordingly, what is needed is an improved method for evidencing and verifying postage indicia. The present invention addresses such a need.

SUMMARY OF THE INVENTION

The present invention provides a method and system for dispensing and evidencing indicia by an indicia generating device in a system having a plurality of indicia generating devices that have been divided into n groups. Each of the indicia generating devices generates and prints indicia on a media that is to be received at a plurality of establishments, wherein the establishments are associated with different geographic designations. The method and system include receiving a plurality of verification keys, wherein each one of the received verification keys is encrypted as a function of a respective geographic designation. A plurality of key IDs are also received, where each one of the key IDs is associated with one of the verification keys and is encrypted as a function of the same geographic designation used to encrypt the corresponding verification key. In response to receiving a request to generate an indicium for a media destined for a particular one of the establishments, the indicia generating device evidences the indicium by generating one of the verification keys and the corresponding key ID assigned to indicia generating device's group based on the geographic designation associated with the particular establishment, and using the generated verification key to create a digital signature, and digitally signing the indicia by including the digital signature and the generated key ID in the indicia.

In one embodiment, the method and system are used to generate and print indicia on media such as tickets, coupons, and the like that will be received by establishments, such as movie theatres and restaurants, for instance. In the preferred embodiment, however, the method and system are used to generate and print indicia for postage on mail that is to be received at a plurality of distribution centers. In this embodiment, the indicia printed on the mail is preferably verified at destination distribution centers, but may also be verified at an originating distribution centers.

According to the preferred embodiment of the method and system disclosed herein, postage validation is now performed at destination distribution centers, rather than at originating distribution centers, and the verification keys, which are encrypted as a function of the destination, are only distributed to the corresponding distribution centers. Thus, even if a destination center were broken into, the perpetrator would only be able to forge postal indicia for mail pieces destined for the particular destination. In addition, the key ID is also encrypted so that even if a perpetrator were to crack a verification key, the perpetrator would still have a problem identifying which verification key was obtained. In order to forge the indicia, the perpetrator must possess two keys, rather than one, a secret key that the PGD used to compute the key ID, and the verification key itself.

DETAILED DESCRIPTION

Figure 1:
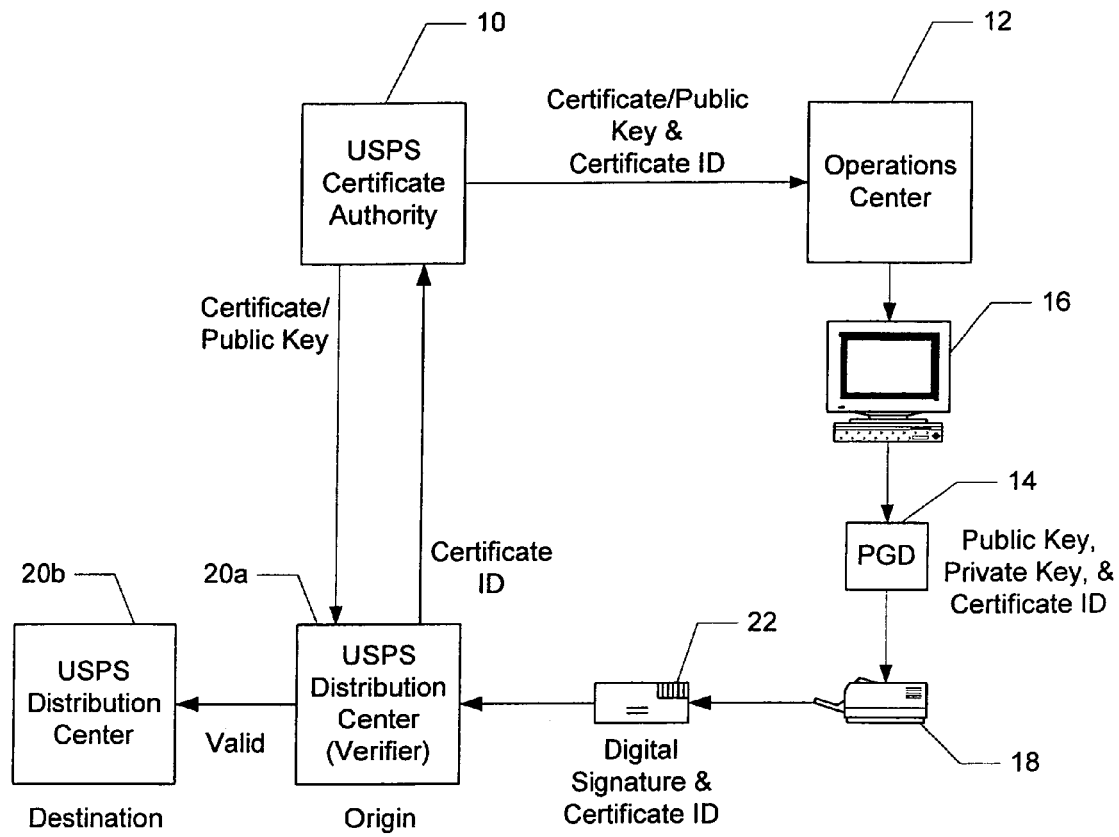
FIG. 1 is a block diagram illustrating a prior art Internet postage system.
Figure 2:
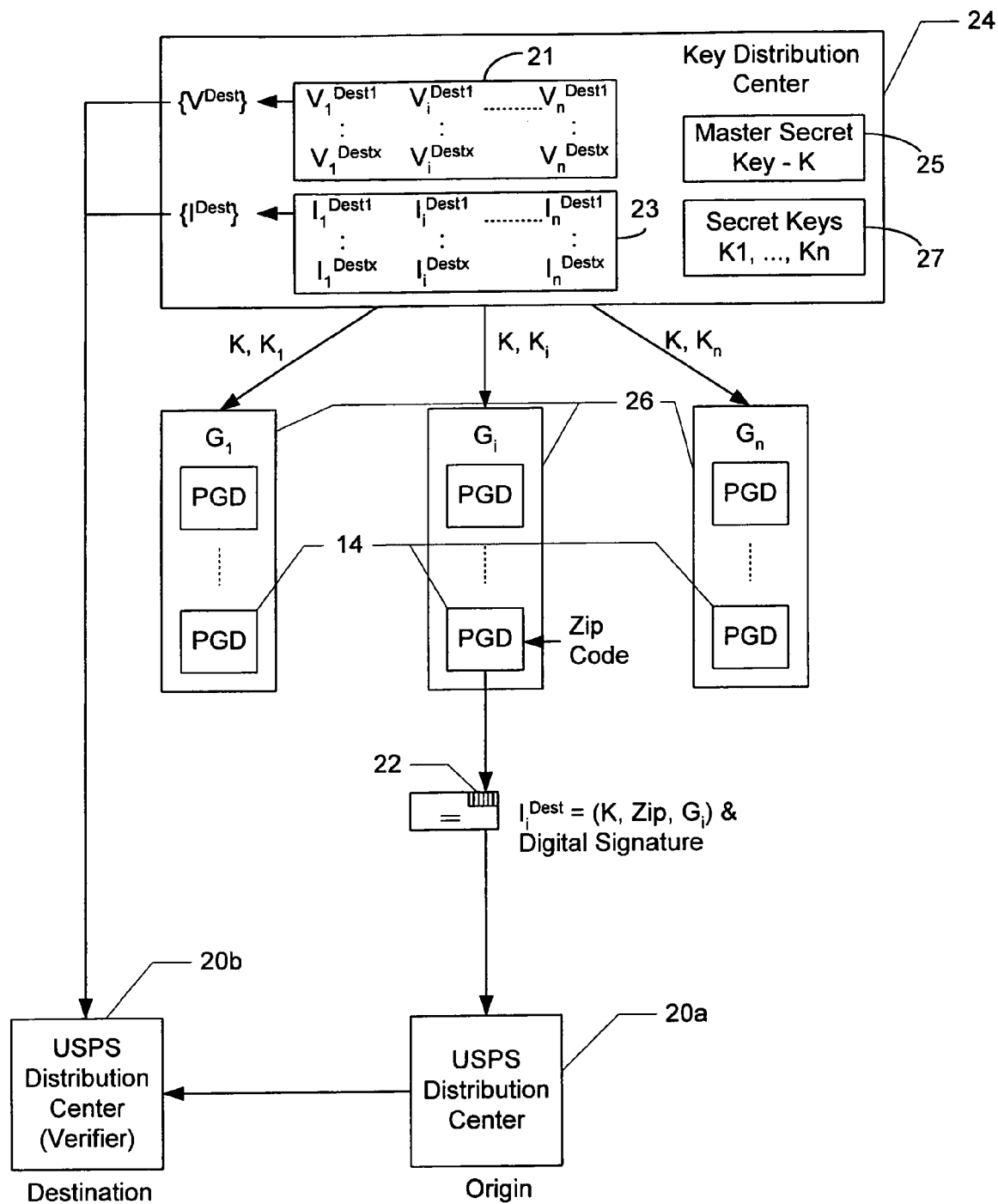
FIG. 2 is a block diagram illustrating a postage evidencing and verification system in accordance with a preferred embodiment of the present invention.

The present invention relates to using key cryptography for evidencing and verifying postage. The following description is presented to enable one of ordinary skill in the art to make and use the invention and is provided in the context of a patent application and its requirements. Various modifications to the preferred embodiment and the generic principles and features described herein will be readily apparent to those skilled in the art. Thus, the present invention is not intended to be limited to the embodiments shown but is to be accorded the widest scope consistent with the principles and features described herein. FIG. 2 is a block diagram illustrating a postage evidencing and verification system in accordance with a preferred embodiment of the present invention, where like components from FIG. 1 have like reference numerals. In a preferred embodiment, the system includes a key distribution center 24, a plurality of postage generating devices (PGDs) 14, and multiple USPS distribution centers 20. The PGDs 14 may be implemented as a computing device separate from the PC 16 (FIG. 1), as software running on the PC 16, or any processing device, such as a cellphone or PDA, or any combination of the two. The function of the key distribution center 24 is to provide the cryptographic keys used by the PGDs 14 to evidence postage, and used by the distribution centers 20 to verify the postage. In a preferred embodiment, the key distribution center 24 distributes the cryptographic keys to the PGDs 14 and to the distribution centers 20 via a telecommunications network, such as the Internet or private link, although other types of distribution methods may also be used. In a preferred embodiment, the key distribution center (KDC) 24 authenticates and distributes the keys via asymmetric encryption to ensure the privacy of the keys and that only authorized devices receive the keys. The KDC 24 may be the USPS certificate authority, or other third party service.

Figure 3:
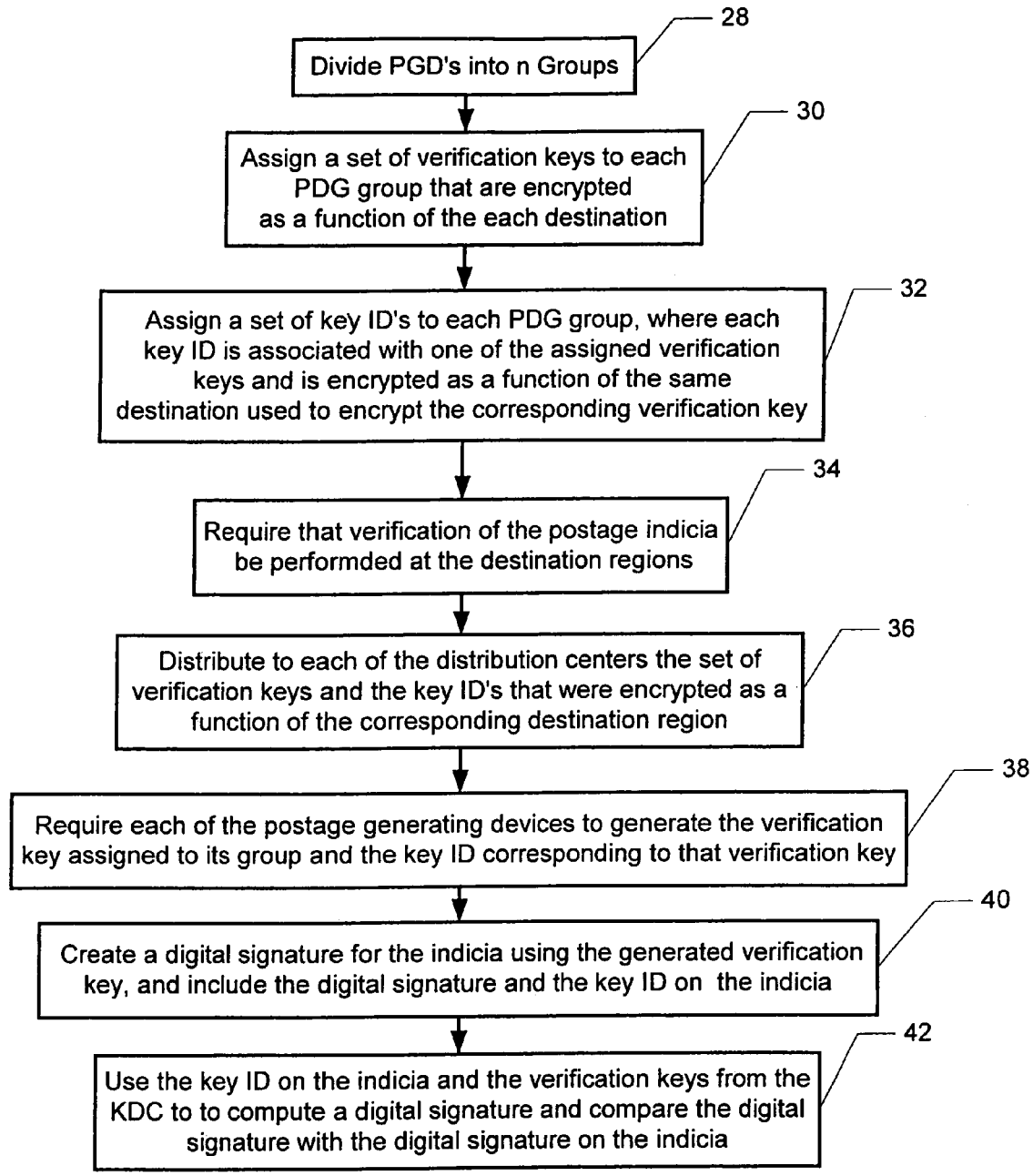
FIG. 3 is a flow chart illustrating the process of evidencing payment of postage using secret key cryptography in the evidencing and verification system of the present invention.

FIG. 3 is a flow chart illustrating the process of evidencing payment of postage using secret key cryptography in the evidencing and verification system of the present invention. Referring to both FIGS. 2 and 3, the process begins by the KDC 24 dividing the PDG's into n groups 26, $G_i$, i=1, . . . n, in step 28. The KDC 24 then in step 30 assigns a set of verification keys 21, $V_i$, to each PGD group 26, where each verification key in the set is encrypted as a function of one of the destination regions. In a preferred embodiment, each destination region corresponds to a zip code region, so the number of verification keys assigned to each PDG group 26 depends on the number of existing zip code regions (shown in FIG. 2 as Dest1 . . . . Destx).

The KDC 24 also assigns in step 32 a set of key ID's 23, $I_i$, to each PGD group 26, where each key ID in the set is associated with one of the assigned verification keys and is encrypted as a function of the same destination region used to encrypt the corresponding verification key. Referring to FIG. 2, the result of steps 30 and 32 is that the column of verification keys 21 and key ID's 23 $\{V_1$ and $I_1\}$ are assigned to PDG group $G_1$, the column of verification keys and key ID's $\{V_i$ and $G_i\}$ are assigned to PDG group $G_i$, and so on.

Referring again to FIG. 3, in a preferred embodiment, it is also required that postal verification of the postage indicia be performed at the plurality of destinations regions, rather than the originating region, in step 34. The postage verification may be performed at the destination distribution centers 20b or by a third party verifier that is in remote communication with the KDC 24.

After assigning the verification keys 21 to the PGD groups 26, the KDC 24 distributes to each distribution center the sets of verification keys 21 and key ID's 23 that were encrypted as a function of the corresponding destination region in step 36. Thus, in FIG. 2 for example, all the verification keys 21 and key ID's 23, $V^{Dest1}$ and $I^{Dest1}$, respectively, would only be distributed to the Distribution center in the destination region designated as "Dest1".

According to another aspect of the present invention, when generating the postage indicia for a mail piece destined for a particular destination, in step 38 the PGD 14 generates one of the verification keys and its corresponding key ID from the set of keys assigned to its group based on the particular destination. By requiring the PGD 14 to generate the verification key, rather than distributing the verification key to the PGD 14, a perpetrator cannot infiltrate the PGD 14 and copy the verification key. The PGD 14 then uses the generated verification key to create a digital signature for the indicia using any well-known message authentication code (MAC) function, and digitally signs the indicia by including the digital signature and the generated key ID on the indicia in step 40.

When the mail is received at the destination region, the indicia is verified using the key ID from the indicia, and the verification keys received from the KDC 24, to compute a new digital signature for the indicia, and by comparing the computed digital signature with the digital signature on the indicia in step 42.

Figure 4:
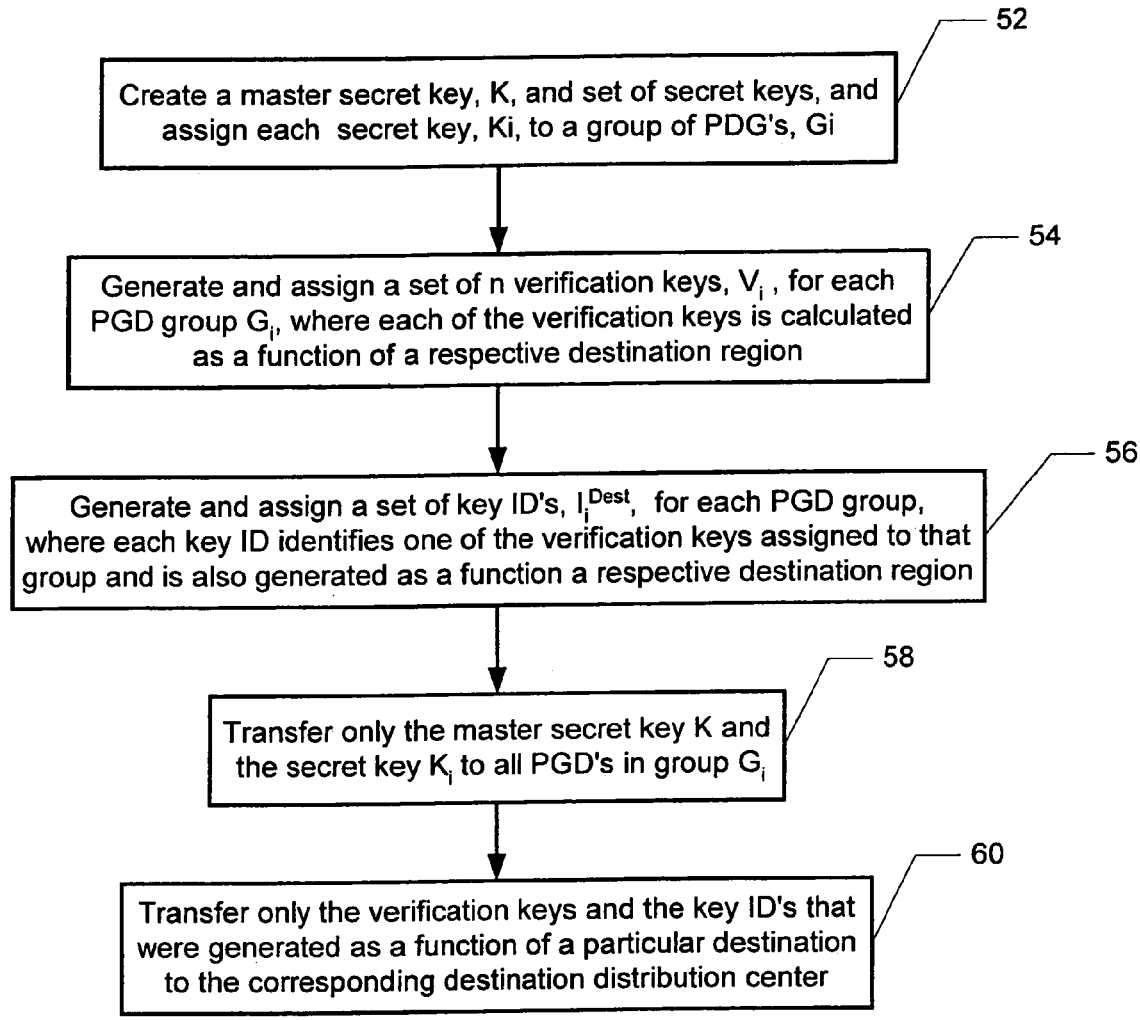
FIG. 4 is a flow chart illustrating in detail the process the KDC uses to generate and distribute cryptographic keys for postage evidencing and verification in accordance with the present invention.

FIG. 4 is a flow chart illustrating in more detail the process the KDC 24 uses to generate and distribute cryptographic keys for postage evidencing and verification in accordance with the present invention. The KDC 24 begins by creating a master secret key 25, K, and a set of secret keys 27, and assigns each secret key, $K_i$, to one of the PDG groups, $G_i$, in step 52.

The KDC 24 in step 54 also generates and assigns a set of n verification keys, $V_i^{Dest}$, i=1, . . . n, for each PGD group $G_i$, where each of the verification keys is calculated as a function of a respective destination region. In a preferred embodiment, each postage verification key $V_i^{Dest}$ is computed as a one-way function of the PGD group secret key $K_i$ and the designation of the postal destination:

$$V_i^{Dest}=H(K_i, Dest)$$

where H may be a one-way function such as md5 (Message Digest 5) or sha-1 (Secure Hash Algorithm-1), and Dest is a designation of the destination region, which in a preferred embodiment, is the first three digits of the destination ZIP code or a first few characters of the postal code.

After generating the verification keys, the KDC 24 in step 56 generates and assigns a set of key ID's, $I_i^{Dest}$, i=1, . . . ,n, for each group, where each key ID corresponds to one of the verification keys assigned to that group and is also generated as a function of a respective destination region. In a preferred embodiment, each key ID is computed as a one-way hash function of the PGD group, $G_i$, the master secret key, K, and a designation of the destination, Dest:

$$I_i^{Dest}=H(K,Dest,G_i)$$

It should be noted that the size of the key ID is selected such that there are no collisions among the key IDs for a particular destination designation.

According to one aspect of the present invention, the keys are distributed in such a manner that each PGD 14 is made unaware of which group verification key V it will use to evidence postage indicia. This is accomplished by transferring only the master secret key K and the group secret key $K_i$ to all PGD's 14 in group $G_i$ in step 58. In addition, only the verification keys $V_i^{Dest}$ and Key ID's $I_i^{Dest}$ generated as a function of a particular destination region are transferred to the corresponding distribution center in step 60, rather than transferring all of the groups of verification keys to all destination distribution centers. In a preferred embodiment, the verification keys $V_i^{Dest}$ and indexes $I_i^{Dest}$ are stored in secure tables at the distribution centers 20.

After all keys have been distributed, the PGDs 14 may perform the process of dispensing and evidencing postage indicia.

Figure 5:
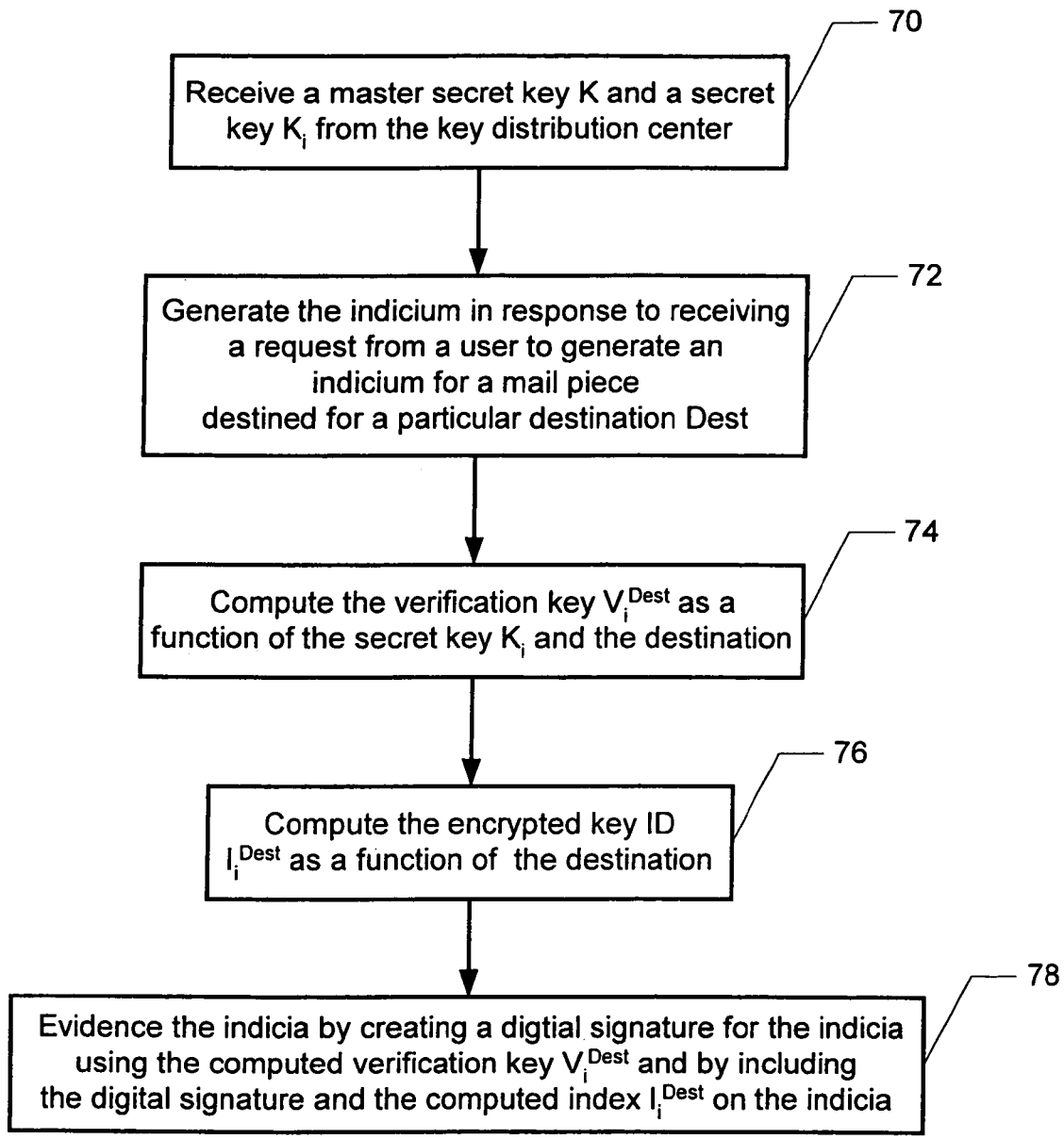
FIG. 5 is a flow chart illustrating the process of dispensing and evidencing postage indicia within the postage generating devices in accordance with a preferred embodiment of the present invention.

FIG. 5 is a flow chart illustrating the process of dispensing and evidencing postage indicia within the postage generating devices 14 in accordance with a preferred embodiment of the present invention. The process begins in step 70 by receiving a master secret key K and a secret key $K_i$ from the KDC 24. In response to receiving a request from a user to generate an indicium for a mail piece destined for a particular destination Dest, the indicium is generated in step 72, and the verification key $V_i^{Dest}$ is computed in step 74 as a function of the secret key $K_i$ and the destination. In a preferred embodiment, the PGD 14 computes the verification key $V_i^{Dest}$ using the function H:

$$V_i^{Dest}=H(K_i, Dest)$$

The PGD 14 also computes the encrypted key ID $I_i^{Dest}$ as a function of the destination in step 76. In a preferred embodiment, the PGD 14 computes the key ID $I_i^{Dest}$ using its assigned group designation $G_i$, the master secret key K shared between all postage-generating devices, and the designation of the postal destination Dest:

$$I_i^{Dest}=H(K,Dest,G_i)$$

The PGD 14 evidences the indicia in step 78 by creating a digital signature for the indicia using the verification key $V_i^{Dest}$ and digitally signs the indicia by including the digital signature and the computed index $I_i^{Dest}$ on the indicia. The mail piece bearing the postage indicia is now ready for mailing and subsequent verification.

Figure 6:
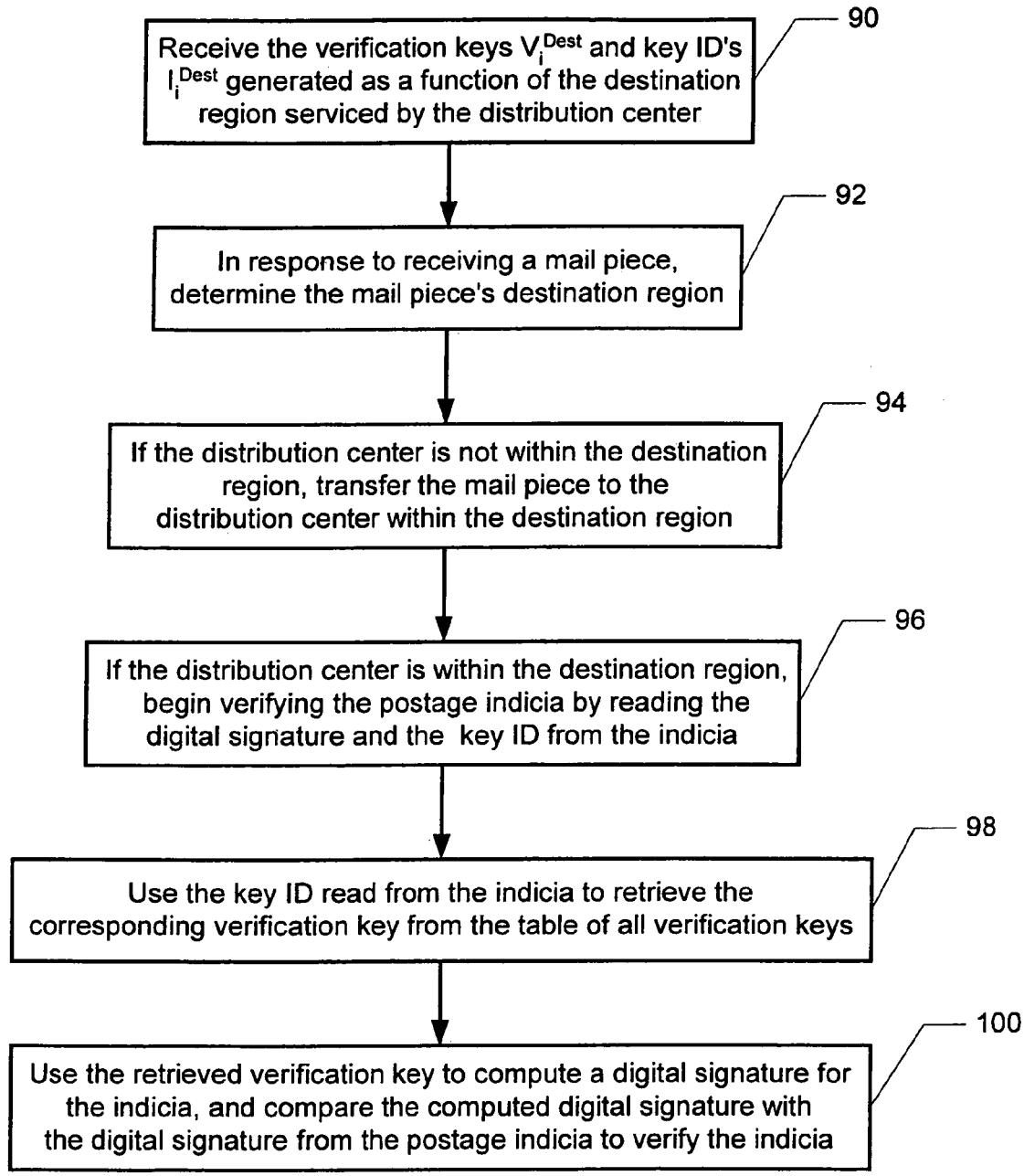
FIG. 6 is a flow chart illustrating the process of verifying postage indicia at a plurality of postal distribution centers in accordance with the present invention.

FIG. 6 is a flow chart illustrating the process of verifying postage indicia at a plurality of postal distribution centers in accordance with the present invention. First, in step 90 each of the destination distribution centers 20 receives from the KDC 24 a set of verification keys $V_i^{Dest}$ and the key ID's $I^{Dest}$ that were generated as a function of the destination region the distribution center 20 services. In a preferred embodiment, the keys are delivered over the Internet and stored in a secure table.

In response to receiving a mail piece, each of the distribution centers 20 determines the mail piece's destination region in step 92. If the distribution center is not within the destination region, then the distribution transfers the mail piece to the destination distribution center 20*b* within the destination region in step 94.

If the distribution center is within the destination region, then the distribution center begins verifying the postage indicia by reading the digital signature and the key ID from the indicia in step 96. The key ID read from the indicia is then used to retrieve the corresponding verification key that was used to create the digital signature from the table containing the verification keys in step 98. The retrieved verification key is then used to compute a new digital signature from the indicia, and the computed digital signature is then compared with the digital signature from the indicia to verify the indicia in step 100.

In accordance with a second embodiment of the present invention, the verification keys and the key ID's are computed as a function of the originating distribution region, rather than the destination region. In this embodiment, the each distribution center 20 still receives the verification keys computed as a function of the region the distribution center services, but the PDGs 14 compute their verification keys based on the originating region where they are located (e.g., the zip code of the return address), and verification of the postage indicia is performed at the originating distribution center where the mail is deposited.

In accordance with a third embodiment of the present invention, the evidencing and verification system may also be used for issuing and evidencing any indicia indicating the value of goods and/or services, such as tickets, coupons, and gift certificates, for instance. In one embodiment, an indicia generating device generates and prints indicia on a media that is to be received at various predetermined destinations. For example, the key distribution center 24 may provide cryptographic keys to a chain of movie theaters, for instance. In this system, the key distribution could service the movie theater chain and issue separate keys for different venues. The operator of each local movie theater could download new keys from the key distribution center 24 periodically (e.g., everyday). In turn, moviegoers having access to a PGD 14 would then download the master secret key and the secret key for their device group from the local movie theater via the Internet. After receiving the keys, the PGD 14 would print and evidence movie tickets, and each movie theater would perform the verification function for verifying the tickets.

Thus, the present invention is applicable to generating and evidencing indicia of value for any media that is to be received at establishments associated with geographic designations, such as addresses and zip codes.

The indicia evidencing and verification system in accordance with the present invention offers significant advantages over prior methods for verifying cryptographic postage evidencing. One advantage is that the verification center is no longer a single point of failure in the postal system, since the verification center does not contain all the verification keys. Because the present invention performs verification only at destination distribution centers 20b and encrypts the keys as a function of the destination, even if a destination center 20b were broken into, the perpetrator would only be able to forge postal indicia for mail pieces destined for the particular destination. Security is not as tight in the second preferred embodiment, however, where the keys are encrypted as a function of the origin and verification is performed at the originating distribution centers 20a, because if an originating distribution center 20a were broken into, the perpetrator would be able to forge postal indicia for all mail pieces as long as every mail piece was mailed from that particular originating distribution center 20a.

Another advantage is that since the PGD 14 encrypts the key ID and sends the key ID along with the verification key on the postage indicia, even if a perpetrator were to crack a verification key, the perpetrator would still have a problem identifying which verification key was obtained. In order to forge the indicia, the perpetrator must possess the secret key that the PGD 14 used to compute the key ID, and the verification key itself. This means that the perpetrator must possess two secret keys rather than one in order to forge the postage indicia.

The present invention has been described in accordance with the embodiments shown, and one of ordinary skill in the art will readily recognize that there could be variations to the embodiments and any variations would be within the spirit and scope of the present invention.

In addition, software written according to the present invention may be stored on a computer-readable media, such as a removable memory, or transmitted over a network, and loaded into the key distribution center computers, the user's PC, the PGD, and distribution center computers for execution. Accordingly, many modifications may be made by one of ordinary skill in the art without departing from the spirit and scope of the appended claims.

What is claimed is:

1. A method for dispensing and evidencing postage indicia by a postage generating device (PGD) in a system having a plurality of PGDs that have been divided into n groups identified by a group designation $G_i$, i=1, ... n, the method performed by the PGD comprising:
   (a) receiving by the PGD a master secret key K and a secret key $K_i$ from a distribution center over a network after manufacture of the PGD, and storing the master secret key K and the secret key $K_i$ in the PGD;
   (b) in response to receiving a request to generate an indicium for a mail piece destined for a particular postal destination Dest, generating the indicium;
   (c) computing by the PGD a verification key $V_i^{Dest}$ as a function of the secret key $K_i$ and the postal destination;
   (d) computing a key ID $I_i^{Dest}$ as a function of the master secret key K and the postal destination;
   (e) using by the PGD the computed verification key $V_i^{Dest}$ to create a digital signature for the indicia; and
   (f) digitally signing by the PGD the indicia by including the digital signature and the computed key ID $I_i^{Dest}$ on the indicia.

2. The method of claim 1 further including the step of computing each verification key $V_i^{Dest}$ as a one-way function H of the PGD group key $K_i$ and a designation of the postal destination:

$$V_i^{Dest}=H(K_i,Dest).$$

3. The method of claim 2 further including the step of using ZIP codes to designate the postal destination.

4. The method of claim 3 further including the step of computing each of the key ID's as a one-way function H of the PGD group, $G_i$, the master secret key, K, and a designation of the postal destination, Dest:

$$I_i^{Dest}=H(K,Dest,G_i).$$

* * * * *